United States Patent
Chen et al.

(10) Patent No.: US 7,523,223 B2
(45) Date of Patent: Apr. 21, 2009

(54) WEB CONTROL SIMULATORS FOR MOBILE DEVICES

(75) Inventors: Yingyu Chen, Shanghai (CN); Yinghui Li, Shanghai (CN)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/601,490

(22) Filed: Nov. 16, 2006

(65) Prior Publication Data

US 2008/0120393 A1    May 22, 2008

(51) Int. Cl.
*G06F 15/16*    (2006.01)
(52) U.S. Cl. .................... 709/246; 709/219
(58) Field of Classification Search .................. 709/246
See application file for complete search history.

(56) References Cited

U.S. PATENT DOCUMENTS

| | | | |
|---|---|---|---|
| 6,489,954 B1 * | 12/2002 | Powlette .................... 709/219 |
| 6,938,170 B1 * | 8/2005 | Kraft et al. ................... 709/203 |
| 2002/0188669 A1 * | 12/2002 | Levine ........................ 709/203 |
| 2004/0181467 A1 * | 9/2004 | Raiyani et al. ................ 705/28 |
| 2005/0216492 A1 * | 9/2005 | Singhal et al. .............. 707/100 |
| 2005/0231517 A1 * | 10/2005 | Tuli ............................ 709/247 |
| 2006/0048051 A1 * | 3/2006 | Lazaridis .................... 709/203 |
| 2006/0230100 A1 * | 10/2006 | Shin et al. ................... 709/203 |

* cited by examiner

*Primary Examiner*—Jeffrey Pwu
*Assistant Examiner*—Benjamin R Bruckart
(74) *Attorney, Agent, or Firm*—Blakely Sokoloff Taylor & Zafman LLP (57) ABSTRACT

Web control simulators for mobile devices are described herein. In one embodiment, a process for simulating Web controls includes, but is not limited to, receiving a first Web page requested by a mobile device over a network, the first Web page having a first element that is not recognizable by the mobile device, and dynamically converting the first element into a second element that is recognizable by the mobile device, such that the first Web page having the second element is capable of being processed by the mobile device. Other methods and apparatuses are also described.

21 Claims, 8 Drawing Sheets

WEB CONTROL SIMULATORS FOR MOBILE DEVICES

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to Web services. More particularly, this invention relates to Web control simulations.

BACKGROUND

With the development of mobile applications, different types of mobile software are growing in popularity, especially the Web applications. Although Web browsers on PCs (personal computers) or mobile devices can display standard HTML (hypertext markup language) Web pages, in most cases PC-based Web pages (applications) are not compatible on the Web browser of mobile devices (e.g., PDA, smart phone, etc.). This is because mobile devices have smaller screens with different resolution (240×320 or less while PC has 1024×768 or more), and the Web browser of mobile devices can only support basic HTML elements and scripts. Most complicated Web controls can not work properly on a mobile browser.

An existing solution is to develop a mobile version of the applications for mobile use purposes, which wastes a lot of time and resource. In general, when a Web request arrives, a Web server will first detect the device type (e.g., a desktop or mobile device) of the request device, then pass a desktop-page to a desktop device or a mobile-page to a mobile device. As a result, the Web server has to maintain multiple versions of a Web page for both a PC platform and a mobile platform.

SUMMARY OF THE DESCRIPTION

Web control simulators for mobile devices are described herein. In one embodiment, a process for simulating Web controls includes, but is not limited to, receiving a first Web page requested by a mobile device over a network, the first Web page having a first element that is not recognizable by the mobile device, and dynamically converting the first element into a second element that is recognizable by the mobile device, such that the first Web page having the second element is capable of being processed by the mobile device.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Web control simulators for mobile devices are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to one embodiment, an additional layer is added on a PC, which includes a control simulator, between mobile clients and a Web server. When a mobile client requests a Web control that a Web browser of the mobile client cannot support, a Web control simulator will get the requested page from the Web server and transfer it to an image returning to the mobile browser. Afterwards, the browser can simply show the image instead of unsupported Web control. Users can do any mouse behavior on the image as before (e.g., click, drag & drop). The mouse behavior will be sent back to the Web control simulator. Then, the Web control simulator will simulate the mouse behavior on the Web page and send back to the Web server. When the Web server responds to the mouse behavior and sends out a new page, the Web control simulator will again catch it and send the new image representing a Web control of the new Web page to the mobile client. As a result, the Web server may only need to maintain one version of a Web page and utilize the Web control simulator to simulate any Web controls that are not recognized by a mobile client. A Web page can be commonly and efficiently used for different Web applications without re-development and work well with most models of mobile devices to show the Web page and realize the data exchanges with users. Developers can make the same Web page run on PC or Mobile without having to specifically develop the same Web page for different kinds of platforms.

Figure 1:
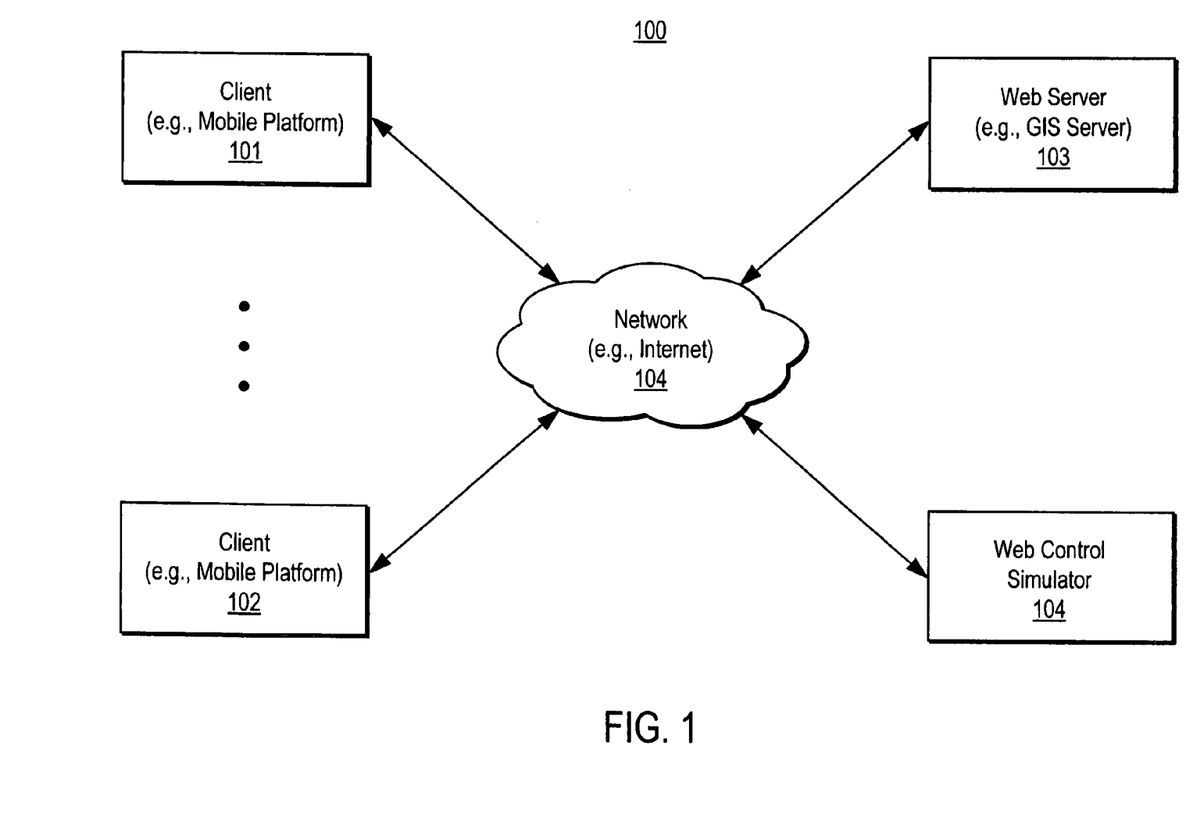
FIG. 1 is a block diagram illustrating a network configuration according to one embodiment of the invention.

FIG. 1 is a block diagram illustrating a network configuration according to one embodiment of the invention. Referring to FIG. 1, network system 100 includes one or more mobile clients 101-102 communicatively coupled to a Web server 103 over a network 104. Network 104 may be a local area network (LAN) such as Intranet or a wide area network (WAN) such as Internet. Web server 103 is configured to provide various Web services to clients 101-102.

"Web services" is a generic term that describes a way of integrating Web-based applications using open standards, such as XML (extensible Markup Language), SOAP (Simple Object Access Protocol), WSDL (Web Services Description Language) and UDDI (Universal Description, Discovery and Integration). XML is used to tag (e.g., define) data sent between applications, SOAP is used to transfer the data, WSDL is used to describe available services, and UDDI is used to list the available services.

Web services can be distributed over various computer networks and typically, although not necessarily, involves communication over the Internet. Users can access Web service hosts through a peer-to-peer arrangement rather than through a central server. Some Web service hosts have the ability to communicate with other Web service hosts directly (e.g., without user intervention).

In one embodiment, Web server may be used to provide geographic map information to a variety of platforms such as PC platform and mobile platform. For example, Web server 103 may be operated by a geographic information service (GIS) provider, such as those available from ESRI of Redlands, Calif.

In addition, system 100 includes a Web control simulator (WCS) 105 communicatively coupled to network 104 to simulate any Web controls, such as, for example, ActiveX controls or Java applets that are not recognizable by clients 101-102. Note that WCS 105 may be implemented as a part of Web server 103 or a stand along server. For example, WCS 105 and Web server 103 may be implemented as a server farm or a cluster of servers. Alternatively, WCS 105 may be third party service provider which may be invoked by Web server 103 as needed (e.g., on-demand basis).

According to one embodiment, WCS 105 provides a universal solution for existing Web sites or service providers to deliver their Web services to mobile devices. For any Web applications which have already implemented their own web solution, there is no need to implement another similar solution again. They can be visited directly by the mobile device through mid-layer device WCS 105. WCS 105 is transparent for the Web server 103.

Figure 5A:
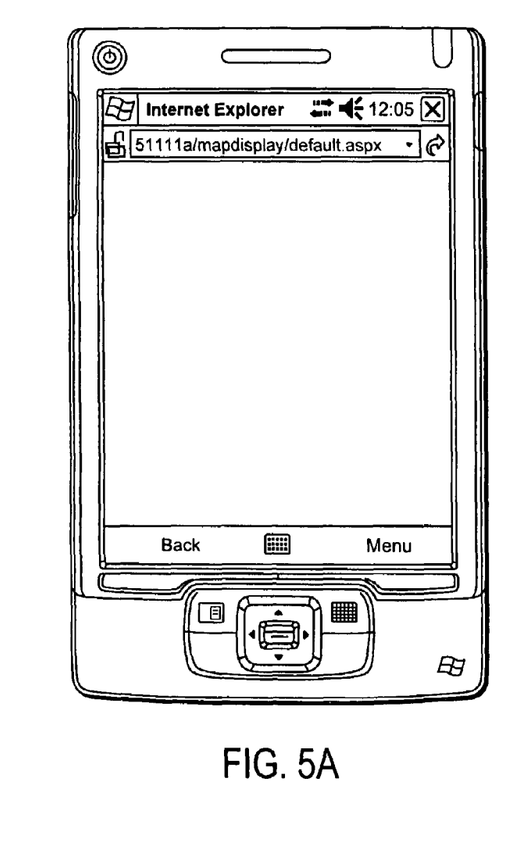
FIGS. 5A-5E are graphical user interfaces illustrating a process of simulating a Web control according to certain embodiments of the invention.
Figure 5B:
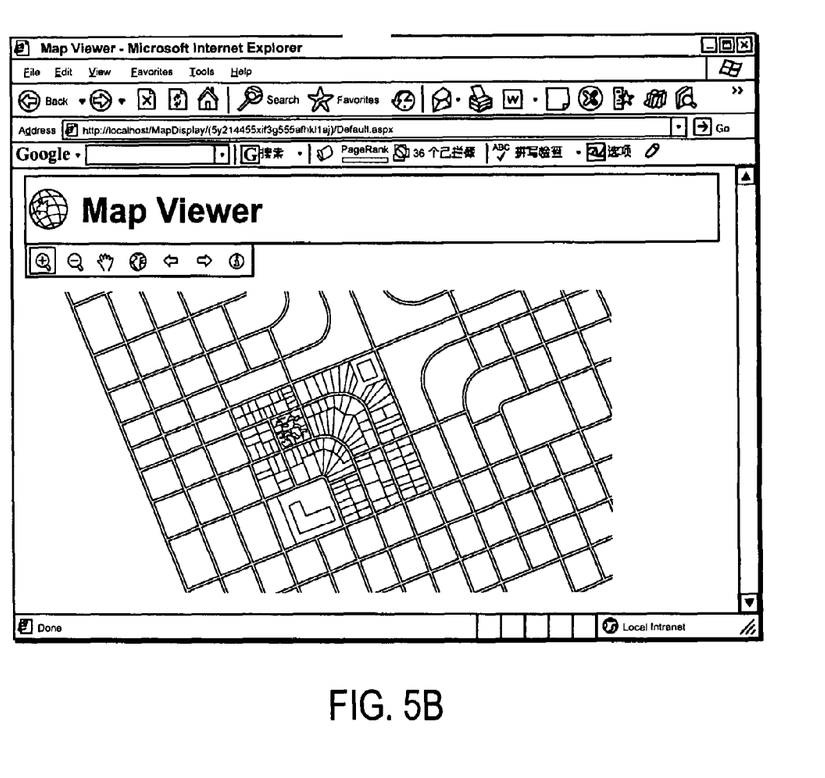
Figure 5C:
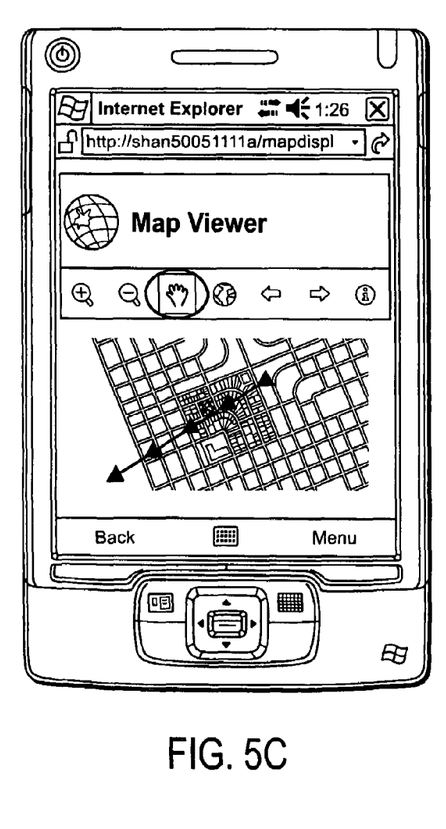

According to certain embodiments of the invention, many existing applications can use WCS 105 without modification. For the purposes of illustration, throughout this application, a GIS (geographic information system) server is used as an example of a Web server 103 to provide map services to client 101-102. Typically, a GIS server is used to provide Web pages containing maps of certain locations requested by client. In general, the Web pages contain certain Web controls which can only be displayed normally in the Web browsers running on the desktops (as shown in FIG. 5B), but not the browsers on a mobile device (as shown in FIG. 5A) because a mobile device may not be able to handle such Web controls. With the help of web control simulator 105, the mobile devices 101-102 can visit the Web site hosted by Web server 103 without any need of modifying the Web pages. The WCS 105 can translate the unrecognized Web controls into the Web elements (e.g., an image as a result of activation of a Web control) that the mobile devices can parse and display (as shown in FIG. 5C) without informing the Web server 103 and/or the mobile devices 101-102.

Figure 2:
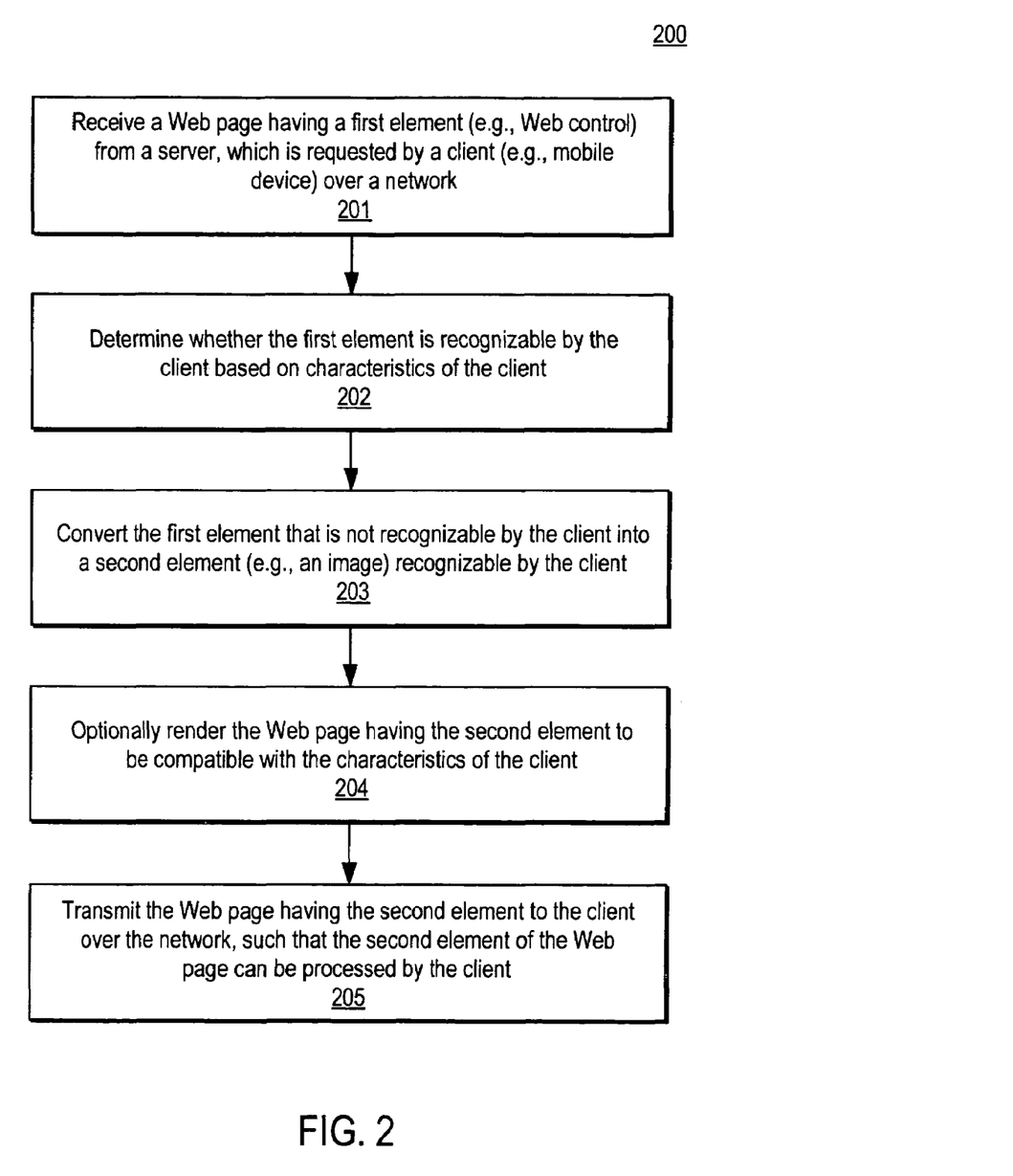
FIG. 2 is a flow diagram illustrating a process of simulating Web controls according to one embodiment of the invention.

FIG. 2 is a flow diagram illustrating a process of simulating Web controls according to one embodiment of the invention. Process 200 may be performed by processing logic which may include software, hardware, or a combination of both. For example, process 200 may be performed by WCS 105 of FIG. 1. In one embodiment, process 200 includes, but is not limited to, receiving a first Web page requested by a mobile device over a network, the first Web page having a first element that is not recognizable by the mobile device, and dynamically converting the first element into a second element that is recognizable by the mobile device, such that the first Web page having the second element is capable of being processed by the mobile device.

Referring to FIG. 2, at block 201, processing logic receives a Web page having a first element (e.g., a Web control) from a Web server, which is requested by a client (e.g., a mobile device) over a network. At block 202, processing logic determines whether the first element is recognizable by the client based on characteristics of the client (e.g., type of mobile device). If the first element is not recognizable by the client, at block 203, the processing logic converts the first element to a second element (e.g., an image) that is recognizable by the client. In one embodiment, the conversion is performed by simulating an activation of the first element (e.g., Web control). At block 204, optionally, a new Web page having the second element is rendered to be compatible with the characteristics of the client, such as fitting within a display of the client properly. At block 205, the new Web page having the second element is transmitted to the client over the network, such that the second element of the Web page can be processed by the client. Other operations may also be performed.

Figure 3:
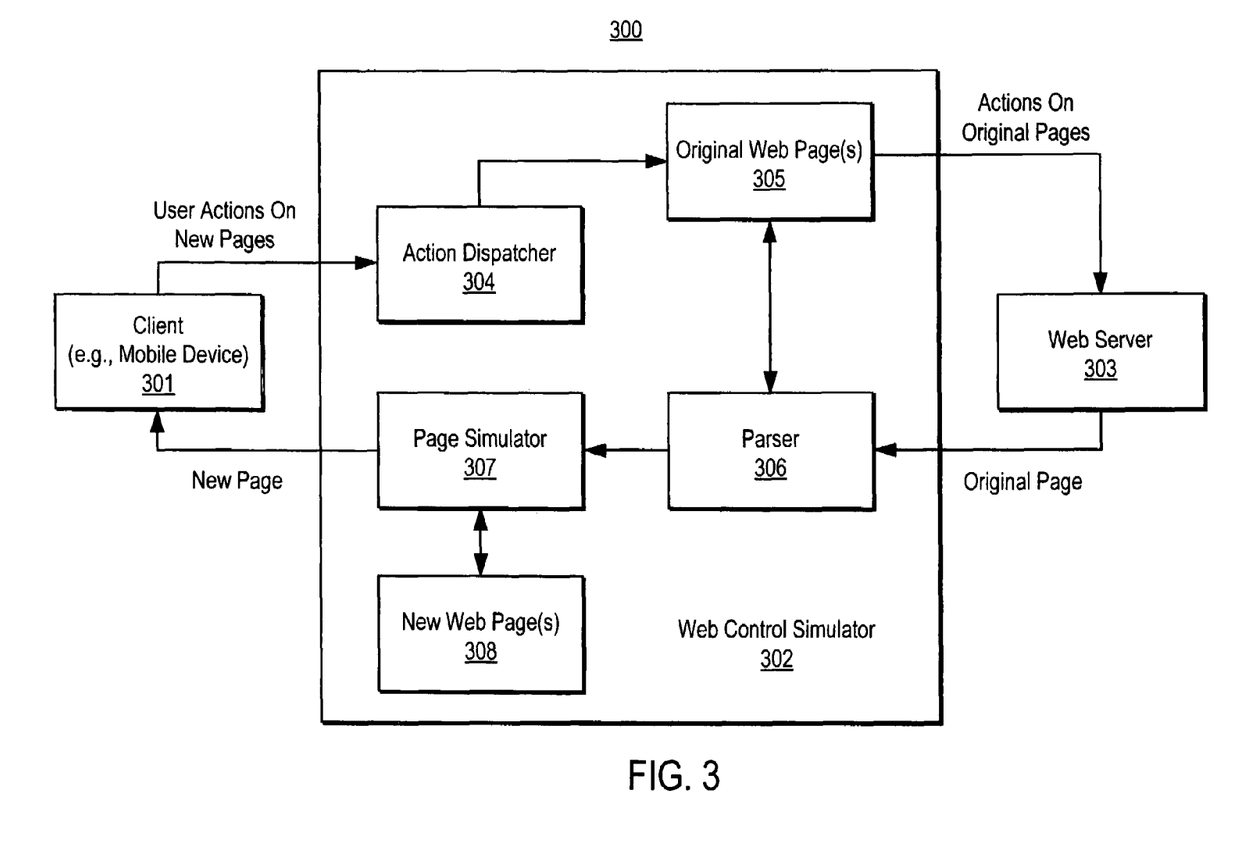
FIG. 3 is a block diagram illustrating a Web control simulation system according to one embodiment.

FIG. 3 is a block diagram illustrating a Web control simulation system according to one embodiment. System 300 may be implemented as part of system 100 of FIG. 1. For example, WCS 302 may be implemented as part of WCS 105 of FIG. 1. In one embodiment, WCS 302 includes, but is not limited to, a parsing unit, in response to a first Web page requested by a mobile device over a network, to determine whether a first element of the first Web page is recognizable by the mobile device, and a page simulator coupled to the parsing to dynamically convert the first element into a second element that is recognizable by the mobile device, such that the first Web page having the second element is capable of being processed by the mobile device.

Referring back to FIG. 3, a client 301 communicatively coupled to WCS 302 over a network, where the WCS 302 performs simulation of Web controls of Web pages hosted by Web server 303. As described above, WCS 302 and Web server 303 may be implemented as a server farm or a cluster of servers. Alternatively, WCS 302 may be a stand alone server, which may be operated by a third party. In one embodiment, WCS 302 includes, but is not limited to, an action dispatcher 304, a parsing unit or parser 306, and a page simulator 307.

In one embodiment, client 301 may be mobile device having a mobile Web browser. A mobile Web browser is somewhat like the common browsers running on the mobile device. However, it typically can only parse the Web pages which have been translated by the WCS 302, because of the limitations the mobile devices. It can display most of the standard HTML elements but cannot display complex Web control like GIS (geographic information service) web controls and Java applets, etc.

Web server 303 can be any Web server or Enterprise server that can provide accessibility to the Web pages like IIS, Apache or NWDI. Because the Web pages are translated by the WCS 302, the Web server 303 does not need additional work to deal with the translations and Web server 303 can only need to maintain one version of Web pages, for either PC platforms or mobile platforms. From the view point of client 301, WCS 302 acts as a proxy server and from the view point of Web server 303, WCS 302 appears as a common client.

In one embodiment, WCS Parser 306 is responsible for parsing all the Web pages 305 from Web server 303. After getting a request of client 301, WCS 302 determines available element list of the client 301. By parsing the Web pages, parser 306 checks all the elements in the Web page and marks the elements which the client 301 cannot display normally. Then WCS 302 saves the Web page on the local disk (e.g., Web pages 305) and runs the Web page in a browser engine 309 such as Internet Explorer from Microsoft or FireFox from Mozilla. The browser engine runs the Web page in the browser engine and traces the execution. So the simulator can get the running status of the elements and the runtime images, which may be downloaded from a remote server or Web server 303 as a result of executing the Web controls by the browser engine.

After parsing the pages, the simulator 307 is ready to translate. In one embodiment, simulator 307 creates a new page (e.g., pages 308) and copies the accepted element in the original page (e.g., pages 305) into the new page without any modification. As for the unaccepted elements, the simulator 307 turns to the browser engine 309 for the running status and gets the runtime pictures through APIs (application programming interfaces). Then simulator 307 replaces the original elements (e.g., first element) with the image (e.g., second element) get from the browser engine and adds the related operations and actions in the form of script languages such as JavaScript. Thereafter, the simulator 307 saves the new page on the local disk (e.g., new pages 308) and transfers the new page to the client 301, for example, over a network which may be a LAN (e.g., Intranet) or WAN (e.g., Internet).

In one embodiment, while the user is browsing a Web page at the client 301, some or all of the actions the user performs on the page are forwarded to the WCS 302. The WCS 302 can find the corresponding original page on which the action should act on. Action dispatcher 304 redirects each action to the old original page (e.g., pages 305) and performs the action via the browser engine 309. Note that each of the functional units or modules 304, 306-307, and 309 may be implemented as processing logic which may include software, hardware, or a combination of both. Web pages 305 and 308 may be maintained by one or more databases or storages. Other configurations may exist.

Figure 4:
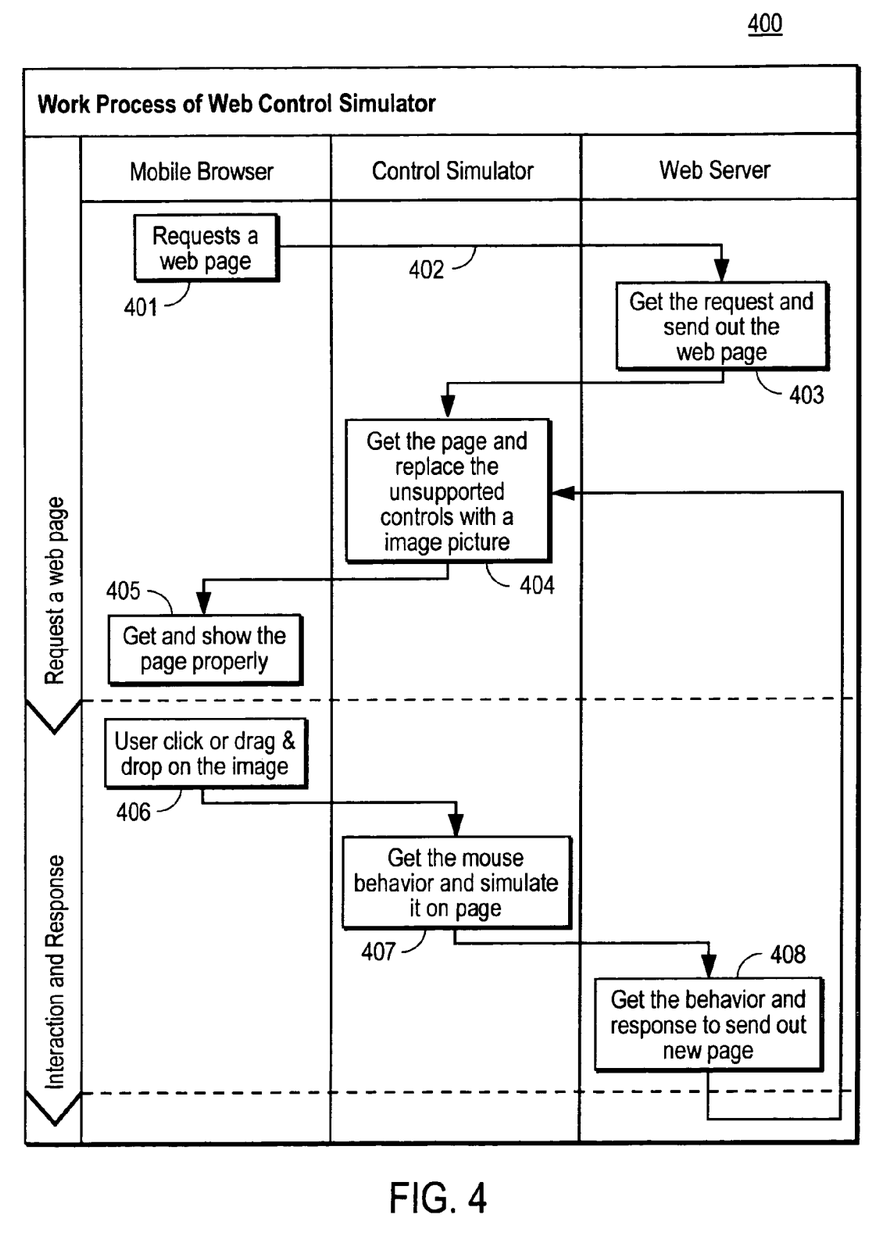
FIG. 4 is a flow diagram illustrating a process for simulating Web controls according to one embodiment of the invention.

FIG. 4 is a flow diagram illustrating a process for simulating Web controls according to one embodiment of the invention. Process 400 may be performed by processing logic which may include software, hardware, or a combination of both. For example, process 400 may be performed by system 100 of FIG. 1 and/or system 300 of FIG. 3. In one embodiment, during operation 401, client sends a HTTP (hypertext transport protocol) request to the WCS (as shown in FIG. 5A). During operation 402, WCS forwards the request to the Web server. In addition, by parsing the HTTP request, the WCS can extract a list of which page element types the client can accept and keep the information in the local storage of the WCS. Then WCS forwards the request to the Web server and waits for a response from the Web server.

During operation 403, the Web server sends a HTTP response back to the WCS. During operation 404, the WCS extracts the Web page from the response. In one embodiment, this page is the original HTML Web page without any modifications just as same as the page a regular platform browser will get (as shown in FIG. 5B). The client gets the modified page from the WCS which have been replaced with the recognized page elements (e.g., images). The user can browse this page and do whatever the user wants to do on this page at block 405. If the user interacts with the page, at block 406 (as shown in FIG. 5C), the actions will be forwarded to the WCS through HTTP protocol. User's actions are in a form that the client can recognize.

Figure 5D:
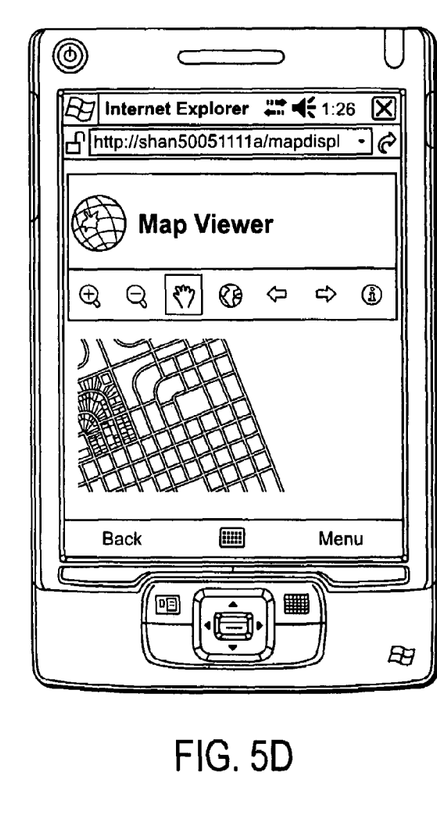
Figure 5E:
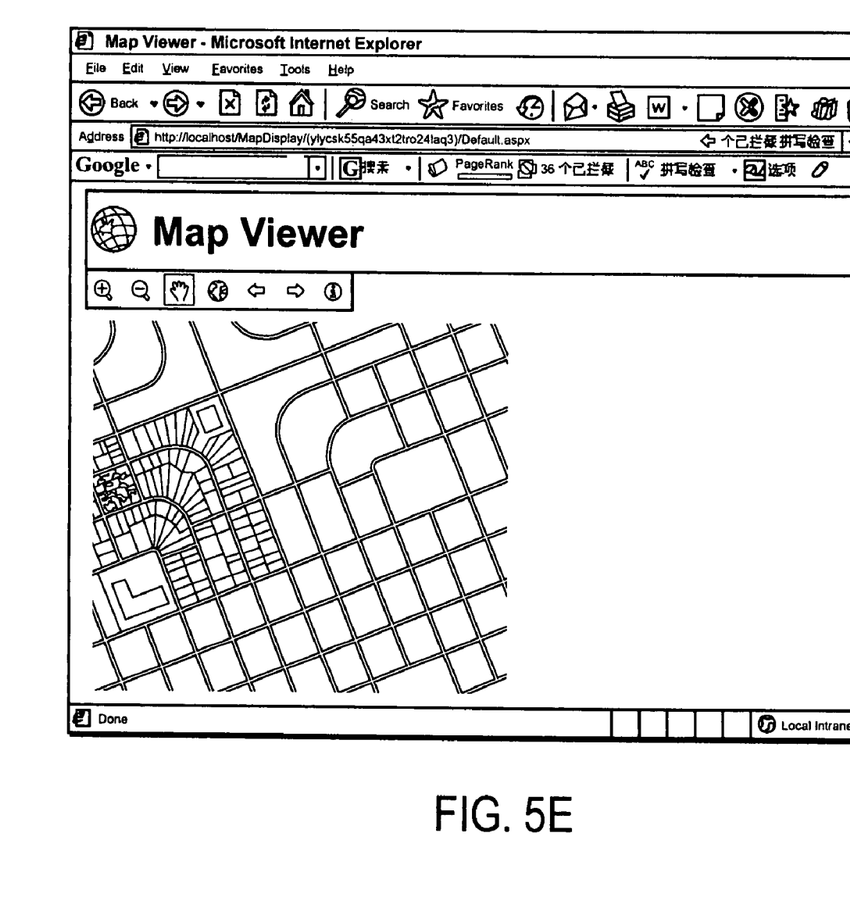

WCS receives the user's action requests, a new page request or a post request. If the request is on the replaced element, at block 407, WCS translates the request into a real HTTP request and performs this action on the corresponding element in the original page from the Web server. At block 408, the Web server receives the request and responds the request by refresh the Web page (as shown in FIG. 5D). FIG. 5E shows a corresponding Web page in a desktop browser environment. Other operations may also be performed.

Figure 6:
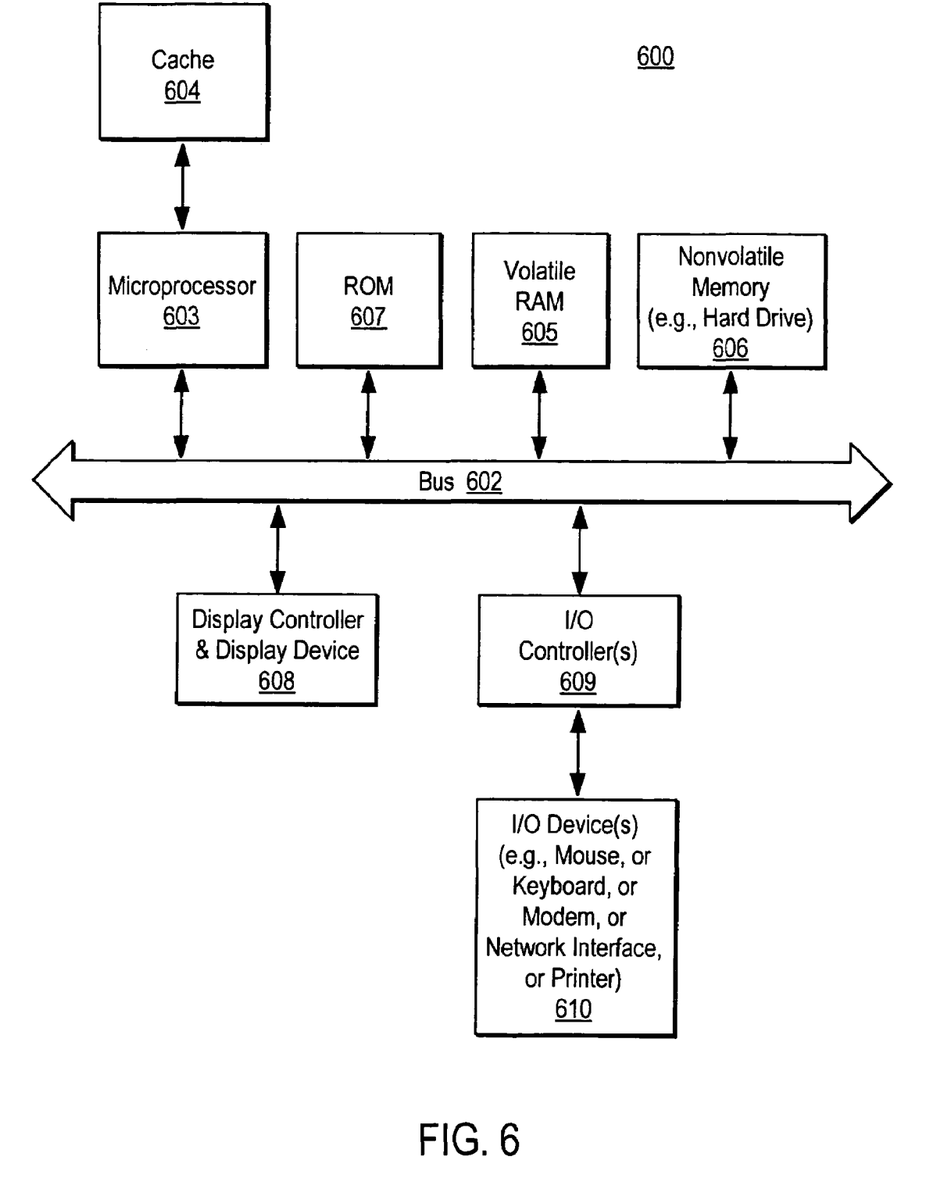
FIG. 6 is a block diagram of a digital processing system, which may be used with one embodiment of the invention.

FIG. 6 is a block diagram of a digital processing system, which may be used with one embodiment of the invention. For example, the system 600 shown in FIG. 6 may be used as a client and/or a server as described above with respect to FIGS. 1 and 3, as well as Web control simulators.

Note that while FIG. 6 illustrates various components of a computer system, it is not intended to represent any particular architecture or manner of interconnecting the components, as such details are not germane to the present invention. It will also be appreciated that network computers, handheld computers, cell phones and other data processing systems which have fewer components or perhaps more components may also be used with the present invention.

As shown in FIG. 6, the system 600, which is a form of a data processing system, includes a bus or interconnect 602 which is coupled to one or more microprocessors 603 and a ROM 607, a volatile RAM 605, and a non-volatile memory 606. The microprocessor 603, which may be, for example, a PowerPC G4 or PowerPC G5 microprocessor from Motorola, Inc. or IBM, is coupled to cache memory 604 as shown in the example of FIG. 6. The bus 602 interconnects these various components together and also interconnects these components 603, 607, 605, and 606 to a display controller and display device 608, as well as to input/output (I/O) devices 610, which may be mice, keyboards, modems, network interfaces, printers, and other devices which are well-known in the art.

Typically, the input/output devices 610 are coupled to the system through input/output controllers 609. The volatile RAM 605 is typically implemented as dynamic RAM (DRAM) which requires power continuously in order to refresh or maintain the data in the memory. The non-volatile memory 606 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 6 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 602 may include one or more buses connected to each other through various bridges, controllers, and/or adapters, as is well-known in the art. In one embodiment, the I/O controller 609 includes a USB (Universal Serial Bus) adapter for controlling USB peripherals. Alternatively, I/O controller 609 may include an IEEE-1394 adapter, also known as FireWire adapter, for controlling FireWire devices.

Thus, Web control simulators for mobile devices have been described herein. Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract")

instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method, comprising:

receiving a request as an HTTP request at a Web control simulation (WCS) server from a mobile device as a client over a network for accessing a Web page hosted by a remote Web server over the network, wherein the mobile device is not capable of rendering a Web control or executing JavaScript embedded within a Web page;

parsing the request to extract an available element list from the request that represents a list of elements that the mobile device is capable of rendering and to store the extracted available element list in a local storage within the WCS server;

receiving a first Web page requested by the mobile device over the network, the first Web page representing the Web page hosted by the remote Web server;

storing the first Web page in the local storage within the WCS server, the first Web page having a first element as a first Web control element and a second element as a standard HTML element, the first Web page being in a markup language;

the WCS server parsing the first Web page to determine if the first element and the second element are recognizable by the mobile device according to the available element list associated with the mobile device, the available element list being maintained by the WCS server, wherein the first element is not listed within the available element list while the second element is listed within the available element list;

invoking a browser engine within the WCS, if the first element being not recognizable by the mobile device, to dynamically render the first element of the first Web page including further interacting with the remote Web server, the browser engine generating a first image representing a result of rendering the first element;

generating a second Web page in the markup language based on the first Web page by replacing the first element of the first Web page with the generated first image that represents the result of rendering the first element, including executing any JavaScript associated with the first Web page, wherein the second Web page further includes the second element without modification that is recognizable by the mobile device;

transmitting the second Web page to the mobile device over the network, such that entire second Web page is recognizable by the mobile device;

storing the second Web page in the local storage within the WCS server including correlations of elements between the first and second Web pages within the WCS server;

in response to a second request received from the mobile device, the second request representing a user interaction with the second Web page, identifying a corresponding interaction associated with the first Web page based on the correlations of the elements between the first and second Web pages, the second request including mouse actions on the generated first image;

invoking the browser engine to simulate the user interaction by performing the identified corresponding interaction on the first Web page, the simulation including the identified corresponding interaction with the first Web page according to the mouse actions, the simulation generating a third request associated with the identified corresponding interaction in view of the first Web page and transmitting the third request to the remote Web server over the network to be rendered by the remote Web server; and in response to a third Web page received from the remote server, forwarding the third Web page to the mobile device representing a response to the user interaction, including invoking the browser engine to render any Web elements within the third Web page that is not recognizable by the mobile device.

2. The method of claim 1, wherein the browser engine traces execution to generate the first image from the first element with a running status and wherein the first image is accessed via application programming interfaces according to the running status.

3. The method of claim 1, further comprising:
determining characteristics of the mobile device based on a request requesting the Web page received from the mobile device, the characteristics including the available element list associated with the mobile device;
downloading an image from the remote web server for the generation of the first image to be compatible with the determined characteristics of the mobile device
retrieving the image via application programming interface (API) according to the rendering of the first Web page; and
generating script codes implementing operations and actions of the first Web control for the second Web page.

4. The method of claim 3, wherein
transmitting the second Web page having the first image to the mobile device over the network is a part of a response to the request.

5. The method of claim 4, further comprising:
receiving a signal from the mobile device over the network in response to an input for activating the first image on the second Web page, wherein the signal includes the second request and wherein the simulation of the user interaction of the first Web page is based on the input received at the first image of the second Web page displayed at the mobile device.

6. The method of claim 5, further comprising:
receiving a third Web page based on the simulation of user interaction of the first image of the second Web page, wherein the third Web page represents a result of the input of activating the first image.

7. The method of claim 6, further comprising converting a second Web control of the third Web page to a second image prior to transmitting the third Web page to the mobile device, if the second Web control is not recognizable by the mobile device.

8. The method of claim 7, wherein the first image is a simulation of a result of activating the first Web control by a browser of the mobile device.

9. A machine-readable storage medium having instructions, when executed by a machine, cause the machine to perform a method, the method comprising:
receiving a request as an HTTP request at a Web control simulation (WCS) server from a mobile device as a client over a network for accessing a Web page hosted by a remote Web server over the network, wherein the mobile device is not capable of rendering a Web control or executing JavaScript embedded within a Web page;
parsing the request to extract an available element list from the request that represents a list of elements that the mobile device is capable of rendering and to store the extracted available element list in a local storage within the WCS server;
receiving a first Web page requested by the mobile device over the network, the first Web page representing the Web page hosted by the remote server;
storing the first Web page in the local storage within the WCS server, the first Web page having a first element as a first Web control element and a second element as a standard HTML element, the first Web page being in a markup language;
the WCS server parsing the first Web page to determine if the first element and the second element are recognizable by the mobile device according to the available element list associated with the mobile device, the available element list being maintained by the WCS server, wherein the first element is not listed within the available element list while the second element is listed within the available element list;
invoking the browser engine within the WCS, if the first element being not recognizable by the mobile device, to dynamically render the first element of the first Web page including further interacting with the remote Web server, the browser engine generating a first image representing a result of rendering the first element;
generating a second Web page in the markup language based on the first Web page by replacing the first element of the first Web page with the generated first image that represents the result of rendering the first element, including executing any JavaScript associated with the first Web page, wherein the second Web page further includes the second element without modification that is recognizable by the mobile device;
transmitting the second Web page to the mobile device over the network, such that entire second Web page is recognizable by the mobile device;
storing the second Web page in the local storage within the WCS server including correlations of elements between the first and second Web pages within the WCS server;

in response to a second request received from the mobile device, the second request representing a user interaction with the second Web page, identifying a corresponding interaction associated with the first Web page based on the correlations of the elements between the first and second Web pages, the second request including mouse actions on the generated first image;

invoking the browser engine to simulate the user interaction by performing the identified corresponding interaction on the first Web page, the simulation including the identified corresponding interaction with the first Web page according to the mouse actions, the simulation generating a third request associated with the identified corresponding interaction in view of the first Web page and transmitting the third request to the remote Web server over the network to be rendered by the remote Web server; and in response to a third Web page received from the remote server, forwarding the third Web page to the mobile device representing a response to the user interaction, including invoking the browser engine to render any Web elements within the third Web page that is not recognizable by the mobile device.

10. The machine-readable storage medium of claim 9, wherein the browser engine traces execution to generate the first image from the first element with a running status and wherein the first image is accessed via application programming interfaces according to the running status.

11. The machine-readable storage medium of claim 9, wherein the method further comprises:

determining characteristics of the mobile device based on a request requesting the Web page received from the mobile device the characteristics including the available element list associated with the mobile device; and downloading an image from the remote web server for the generation of the first image to be compatible with the determined characteristics of the mobile device.

12. The machine-readable storage medium of claim 11, wherein transmitting the second Web page having the first image to the mobile device over the network is a part of a response to the request.

13. The machine-readable storage medium of claim 12, wherein the method further comprises:

receiving a signal from the mobile device over the network in response to an input for activating the first image on the second Web page, wherein the signal includes the second request and wherein the simulation of the user interaction of the first Web page is based on the input received at the first image of the second Web page displayed at the mobile device.

14. The machine-readable storage medium of claim 13, wherein the method further comprises:

receiving a third Web page based on the simulation of user interaction of the first image of the third Web page, wherein the third Web page represents a result of the input of activating the first image.

15. The machine-readable storage medium of claim 14, wherein the method further comprises converting a second Web control of the third Web page to a second image prior to transmitting the third Web page to the mobile device, if the second Web control is not recognizable by the mobile device.

16. The machine-readable storage medium of claim 15, wherein the first image is a simulation of a result of activating the first Web control by a browser of the mobile device.

17. An apparatus, comprising:

a parsing unit, in response to a first Web page in a markup language having a first element as a first Web control element and a second element as a standard HTML element, the Web page being requested by a mobile device over a network, to determine whether the first element and the second element of the first Web page are recognizable by the mobile device according to an available element list associated with the mobile device, wherein a request as an HTTP request is received from the mobile device as a client over a network for accessing a Web page hosted by a remote Web sewer over the network, wherein the mobile device is not capable of rendering a Web control or executing JavaScript embedded within a Web page, wherein the request is parsed to extract the available element list from the request that represents a list of elements that the mobile device is capable of rendering and to store the extracted available element list in a local storage locally coupled with the parsing unit, wherein the first Web page is stored in the local storage; and a page simulator coupled to the parsing unit to invoke a browser engine within the WCS, if the first element being not recognizable by the mobile device, to dynamically render the first element of the first Web page including farther interacting with the remote Web server, the browser engine generating a first image representing a result of rendering the first element, wherein a second Web page in the markup language is generated based on the first Web page by replacing the first element of the first Web page with the generated first image that represents the result of rendering the first element, including executing any JavaScript associated with the first Web page, wherein the second Web page further includes the second element without modification that is recognizable by the mobile device, and wherein the second Web page is transmitted to the mobile device over the network, such that entire second Web page is recognizable by the mobile device, wherein the second Web page is stored in the local storage within the WCS server including correlations of elements between the first and the second Web pages within the WCS server, wherein the simulator unit is configured to, in response to a second request received from the mobile device, the second request representing a user interaction with the second Web page, identify a corresponding interaction associated with the first Web page based on the correlations of the elements between the first and second Web pages, the second request including mouse actions on the generated first image, invoke a browser engine to simulate the user interaction by performing the identified corresponding interaction on the first Web page, the simulation including the identified corresponding interaction with the first Web page according to the mouse actions, the simulation generating a third request associated with the identified corresponding interaction in view of the first Web page and transmitting the third request to the remote Web server over the network to be rendered by the remote Web server, and in response to a third Web page received from the remote server, forward the third web to the mobile device representing a response to the user interaction, including invoking the browser engine to render any Web elements within the third Web page that is not recognizable by the mobile device.

18. The apparatus of claim 17, wherein the browser engine traces execution to generate the first image from the first element with a running status and wherein the first image is accessed via application programming interfaces according to the running status.

19. The apparatus of claim 17, wherein the parsing unit is further configured
- to determine characteristics of the mobile device based on a request requesting the Web page received from the mobile device, the characteristics including the available element list associated with the mobile device,
- to download an image from the remote Web server for the generation of the first image to be compatible with the determined characteristics of the mobile device to be compatible with the determined characteristics of the mobile device,
- to receive the image via application programming interface (API) according to the rendering of the first Web page, and
- to generate script codes implementing operations and actions of the first Web control for the second Web page.

20. The apparatus of claim 19, further comprising an action dispatcher coupled to the parsing unit to dispatch a user interaction in response to the second element of the Web page to the Web server hosting Web pages.

21. A machine-implemented method, comprising:
- receiving a request as an HTTP request at a Web control simulation (WCS) server from a mobile device as a client over a network for accessing a Web page hosted by a remote Web server over the network;
- parsing the request to extract an available element list from the request that represents a list of elements that the mobile device is capable of rendering and to store the extracted available element list in a local storage within the WCS server;
- receiving a first Web page requested by the mobile device over the network, the first Web page representing the Web page hosted by the remote Web server;
- storing the first Web page in the local storage within the WCS server, the first Web page having a first element as a first Web control element and a second element as a standard HTML element, the first Web page being in a markup language;
- the WCS server parsing the first Web page to determine if the first element and the second element are recognizable by the mobile device according to the available element list associated with the mobile device, wherein the first element is not listed within the available element list while the second element is listed within the available element list, the available element list being maintained by the WCS server;
- invoking a browser engine within the WCS, if the first element being not recognizable by the mobile device, to dynamically render the first element of the first Web page including further interacting with the remote Web server, the browser engine generating a first image representing a result of rendering the first element;
- generating a second Web page in the markup language based on the first Web page by replacing the first element of the first Web page with the generated first image that represents the result of rendering the first element, including executing any JavaScript associated with the first Web page, wherein the second Web page further includes the second element that is recognizable by the mobile device;
- transmitting the second Web page to the mobile device over the network, such that entire second Web page is recognizable by the mobile device;
- storing the second Web page in the local storage within the WCS server including correlations of elements between the first and second Web pages within the WCS server;
- in response to a second request received from the mobile device, the second request representing a user interaction with the second Web page, identifying a corresponding interaction associated with the first Web page based on the correlations of the elements between the first and second Web pages, the second request including mouse actions on the generated first image;
- invoking the browser engine to simulate the user interaction by performing the identified corresponding interaction on the first Web page, the simulation including the identified corresponding interaction with the first Web page according to the mouse actions, the simulation generating a third request associated with the identified corresponding interaction in view of the first Web page and transmitting the third request to the remote Web server over the network to be rendered by the remote Web server; and
- in response to a third Web page received from the remote server, forwarding the third Web page to the mobile device representing a response to the user interaction, including invoking the browser engine to render any Web elements within the
- third Web page that is not recognizable by the mobile device.

* * * * *